US007382898B2

(12) United States Patent
Aggarwal et al.

(10) Patent No.: US 7,382,898 B2
(45) Date of Patent: Jun. 3, 2008

(54) METHOD AND APPARATUS FOR DETECTING LEFT OBJECTS

(75) Inventors: Manoj Aggarwal, Lawrenceville, NJ (US); Supun Samarasekera, Princeton, NJ (US); Keith Hanna, Princeton Jct., NJ (US)

(73) Assignee: Sarnoff Corporation, Princeton, NJ (US)

( * ) Notice: Subject to any disclaimer, the term of this patent is extended or adjusted under 35 U.S.C. 154(b) by 462 days.

(21) Appl. No.: 11/152,889

(22) Filed: Jun. 15, 2005

(65) Prior Publication Data

US 2006/0002586 A1 Jan. 5, 2006

Related U.S. Application Data

(60) Provisional application No. 60/579,826, filed on Jun. 15, 2004.

(51) Int. Cl.
*G06K 9/00* (2006.01)
(52) U.S. Cl. .................. 382/103; 382/168; 382/218; 382/219
(58) Field of Classification Search ............ 382/103, 382/104, 115, 181, 218, 219, 224, 168; 348/143
See application file for complete search history.

(56) References Cited

U.S. PATENT DOCUMENTS 6,724,915 B1 * 4/2004 Toklu et al. ............... 382/103

| 2002/0181739 | A1 | 12/2002 | Hallowell et al. | |
| 2004/0151342 | A1 | 8/2004 | Venetianer et al. | |
| 2004/0161133 | A1 * | 8/2004 | Elazar et al. | 382/115 |
| 2004/0240542 | A1 * | 12/2004 | Yeredor et al. | 375/240.01 |
| 2004/0268380 | A1 | 12/2004 | Divakaran et al. | |
| 2005/0036658 | A1 * | 2/2005 | Gibbins et al. | 382/103 |

OTHER PUBLICATIONS

Stringa, E. et al., Real-Time Video-Shot Detection for Scene Surveillance Applications, IEEE Transactions on Image processing, Jan. 2000, pp. 69-79.

* cited by examiner

*Primary Examiner*—Bhavesh Mehta
*Assistant Examiner*—John B Strege
(74) *Attorney, Agent, or Firm*—Lowenstein Sandler PC

(57) ABSTRACT

A method and apparatus for detecting objects (e.g., bags, vehicles, etc.) left in a field of view are disclosed. A long-term representation and a short-term representation of the field of view are constructed, and a difference between the long-term representation and the short-term representation is calculated. One or more criteria may optionally be applied to this difference to determine whether the difference represents an object that was left in the field of view.

15 Claims, 3 Drawing Sheets

METHOD AND APPARATUS FOR DETECTING LEFT OBJECTS

CROSS-REFERENCE TO RELATED APPLICATIONS

This application claims benefit of U.S. provisional patent application Ser. No. 60/579,826, filed Jun. 15, 2004, which is herein incorporated by reference in its entirety.

BACKGROUND OF THE INVENTION

In certain sensitive locations where security is a concern (e.g., airports, train stations, military bases), people and objects are often closely monitored to detect suspicious (e.g., potentially dangerous and/or malicious) activity such as the leaving of objects (e.g., unattended bags, stopped vehicles, etc.) and other activity that might indicate a security threat.

Many existing left object detection applications for monitoring such activity rely on explicit long-term tracking of multiple objects in a scene, and a left object is signaled when one or more tracked objects come to a standstill for a preset period of time. Since accurate long-term tracking of multiple objects in general scenes is still an unsolved problem, these methods are prone to error due to confusion, caused, for example, by occlusions and normal variations in ambient illumination and local changes due to shadows cast by static structures such as buildings, tress, poles, etc. These errors often result in false alarms being generated, e.g., where innocent activity or movement is mistaken for suspicious activity. Thus, a significant amount of time and resources may be wasted on relatively trivial occurrences and panic may be unnecessarily generated. Alternatively, methods that operate on a reduced sensitivity in order to compensate for this tendency to generate false alarms often tend to overlook real security threats, which can also have disastrous consequences.

Therefore, there is a need in the art for a method and apparatus for detecting left objects that is capable of detecting such objects with a low false alarm rate.

SUMMARY OF THE INVENTION

A method and apparatus for detecting objects (e.g., bags, vehicles, etc.) left in a field of view are disclosed. In one embodiment, a long-term representation and a short-term representation of the field of view are constructed, and a difference between the long-term representation and the short-term representation is calculated. One or more criteria may optionally be applied to this difference to determine whether the difference represents an object that was left in the field of view.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention relates to a method and apparatus for detecting left objects (e.g., unattended bags, parked vehicles, etc.) with a substantially reduced rate of false alarms as compared to existing technology. The present invention is able to distinguish between objects that may legitimately be a security concern and harmless environmental or incidental conditions, thereby substantially restricting analysis to events that most require further inspection or analysis.

Figure 1:
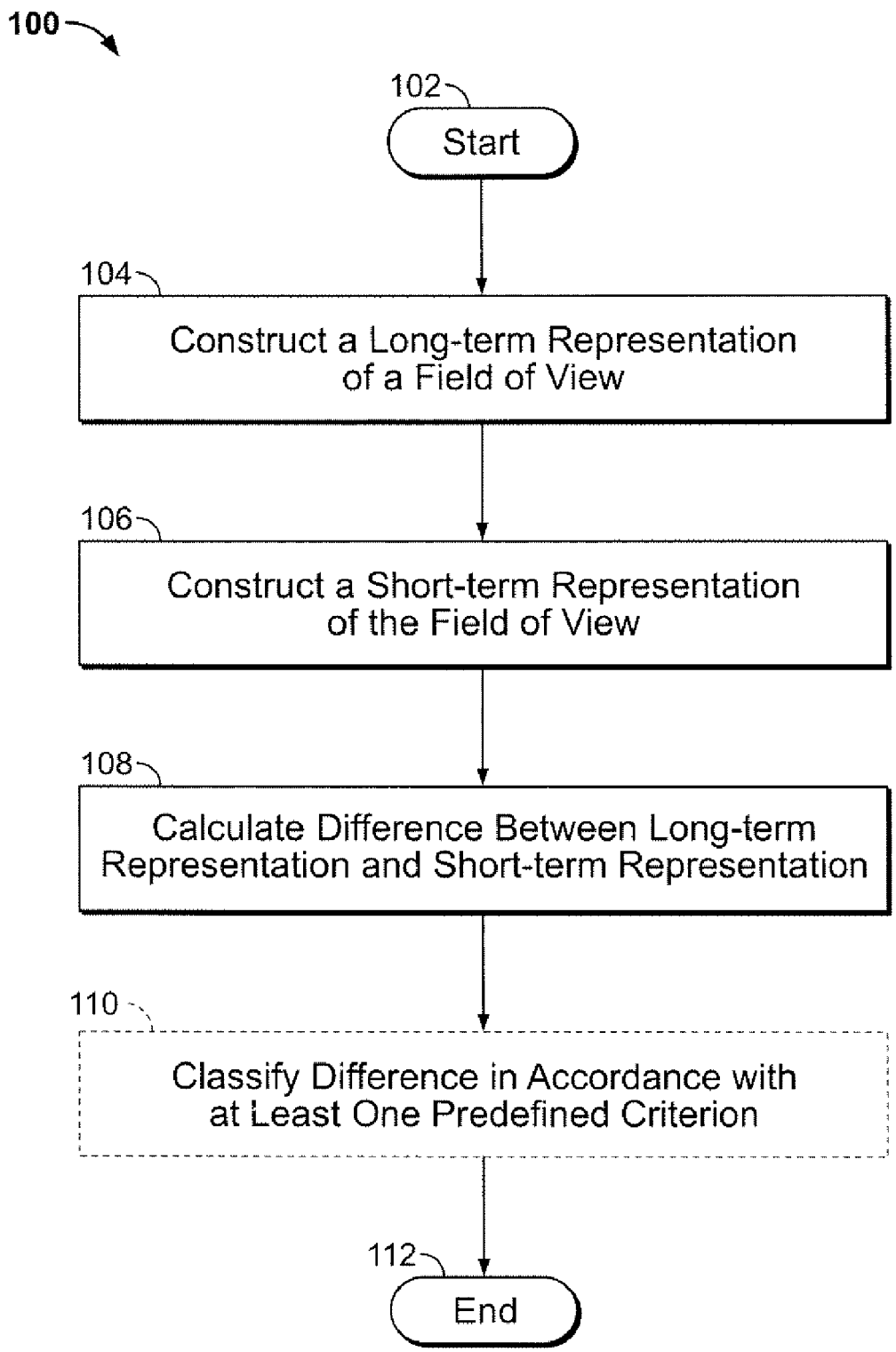
FIG. 1 is a flow diagram illustrating one embodiment of a method for detecting left objects.

FIG. 1 is a flow diagram illustrating one embodiment of a method 100 for detecting left objects, e.g., in a monitored location such as an airport, a train station or a military base. Specifically, the method 100 detects left objects in a given field of view (e.g., as determined by the placement of one or more cameras). The method 100 is initialized at step 102 and proceeds to step 104, where the method 100 constructs a long-term (reference) representation of the field of view. For example, the method 100 may construct a representation of the field of view over x minutes. In one embodiment, the long-term representation is constructed in a manner that excludes substantially all dynamic objects (e.g., moving vehicles and people) and includes mainly static scene components that persist over the duration of the representation.

In step 106, the method 100 constructs a short-term representation of the field of view. The duration of the short-term representation is relative to the long-term representation. Thus, for example, if the duration of the long-term representation is x minutes, the duration of the short-term representation might be x-2 minutes, and so on. In one embodiment, the duration of the short-term representation is selected to be the left object detection time period. Like the long-term representation, in one embodiment, the short-term representation is constructed in a manner that excludes substantially all dynamic objects and includes mainly static scene components that persist over the duration of the representation.

Once the long-term representation and the short-term representation have been constructed, the method 100 proceeds to step 108 and calculates a difference between the long-term representation and the short-term representation. In one embodiment, this difference is calculated on a per-pixel basis. Step 108 assumes that the appearance of a new object in the field of view (e.g., as presented in the short-term representation) is different from the appearance of the background of the field of view (e.g., as presented in the long-term representation). Thus, in one embodiment, the difference as calculated in step 108 may be classified as a left object.

In one embodiment, once the difference is calculated, the method 100 proceeds to optional step 110 and classifies the difference in accordance with one or more predefined criteria intended to increase a measure of confidence that the difference represents a left object. For example, in one embodiment, the method 100 applies at least one of the following criteria:

(1) The appearance of any object detected in step 108 is substantially constant. This condition substantially ensures that a false alarm is not triggered in response to objects that are merely moving slowly, such as fluttering leaves or slowly moving traffic or shadows. In such cases, a short-term representation would be very different from a long-term representation; however, the appearance of pixels comprising the detected object would be constantly changing;

(2) The appearance of any object detected in step 108 is different from the appearance of the background just before introduction of the object. This condition substantially ensures that a false alarm is not triggered in response to corruption of the background image due to harmless events, such as fast-moving shadows or a sudden clearance of long-standing traffic. This condition also enables the recovery of the long-term representation after such an event. Thus, this condition essentially reinforces the assumption that the short-term representation (e.g., the new object's appearance) is different from that of the background (e.g., the long-term representation);

(3) Any object detected in step 108 is brought into the field of view. This condition substantially ensures that a false alarm is not generated in response to scene changes whose origin cannot be tracked back to a starting location, such as appearing or disappearing shadows or changes in illumination. Thus, this condition constrains object detection pixel intensity variations over space as well as time;

(4) Any object detected in step 108 is accompanied by motion around the time the object is hypothesized to be left. This condition is a corollary to condition number 3 and substantially ensures that a false alarm is not generated in response to varying environmental conditions, such as the sun suddenly appearing from behind a cloud and casting strong building shadows or lights being turned on or off. Such events are typically characterized by a lack of motion at the time of occurrence; and (5) For a short time before any object detected in step 108 is first hypothesized to be left, changes in pixel intensity are accompanied by some motion. Like condition number 4, this condition is a corollary to condition number 3 and substantially ensures that a false alarm is not generated in response to varying environmental conditions that are typically characterized by a lack of motion at the time of occurrence.

The method 100 terminates in step 112.

Thus, the method 100 enables the rapid detection of left objects with a substantially reduced occurrence of false alarms in monitored locations using local spatio-temporal constraints, without necessarily tracking multiple objects over the field of view, and thus is not affected by inherent drawbacks of techniques relying on long-term object tracking. By comparing long- and short-term representations of a monitored field of view, and by optionally applying one or more confidence-enhancing criteria to hypothesized left objects, the method 100 is able to weed out harmless or insignificant events from those that legitimately may represent a security threat and warrant further inspection. A significant amount of time and resources that might otherwise be wasted on inspecting false alarms may thus be conserved for situations in which they are genuinely needed. Moreover, genuine security threats are more readily detected and are less likely to be overlooked.

Figure 2:
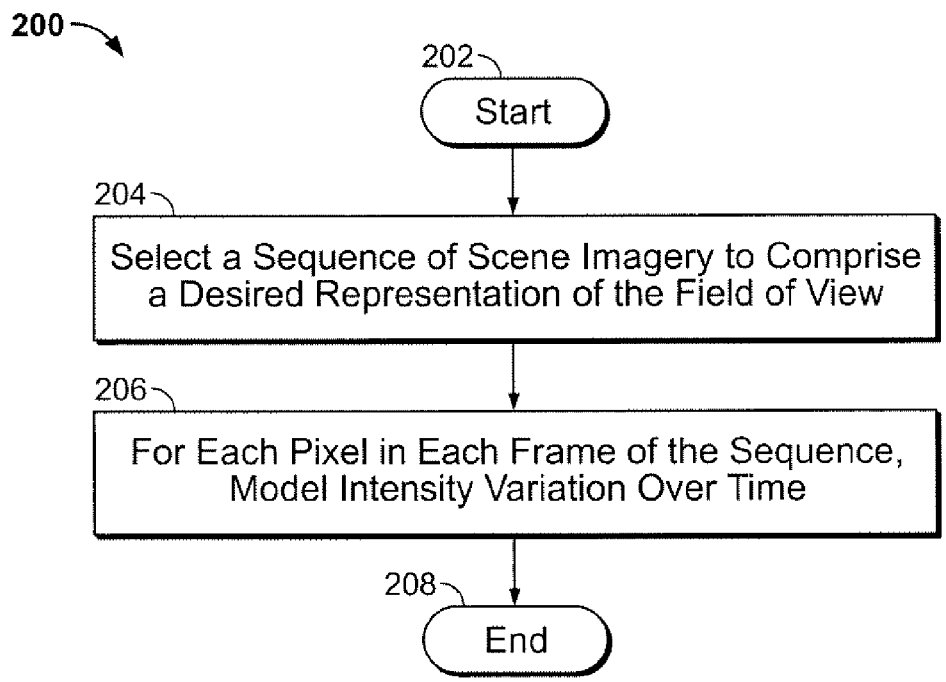
FIG. 2 is a flow diagram illustrating one embodiment of a method for constructing a representation of a field of view.

FIG. 2 is a flow diagram illustrating one embodiment of a method 200 for constructing a representation (e.g., long- or short-term) of a field of view, for example in accordance with steps 104 and 106 of the method 100. The method 200 is initialized in step 202 and proceeds to step 204, where the method 200 selects a sequence of scene imagery to comprise the desired representation of the field of view.

In step 206, the method 200 models, for each pixel in each frame of the sequence of scene imagery, the intensity variation over time (e.g., over the duration of the selected sequence). In one embodiment, this intensity variation over time is modeled as a histogram that encodes the intensity variation as is (e.g., without any restrictive parameterizations) and can distinguish between complex, naturally time-varying phenomena. Thus, calculation of the difference between the long- and short-term representations (e.g., in accordance with step 108 of the method 100) may be performed using histogram matching, which substantially reduces the generation of false alarms due to time-varying phenomena. Consequently, distinction is more clearly made between occurrences such as blinking lights on a stationary vehicle (e.g., where the effect of the blinking lights may cause a short-term histogram to have two high peaks rather than one, but the short- and long-term histograms continue to be similar due to their periodicity) and fluttering leaves (e.g., where the histograms are aperiodic and tend to be flat without any distinguishing characteristic or similarity).

Figure 3:
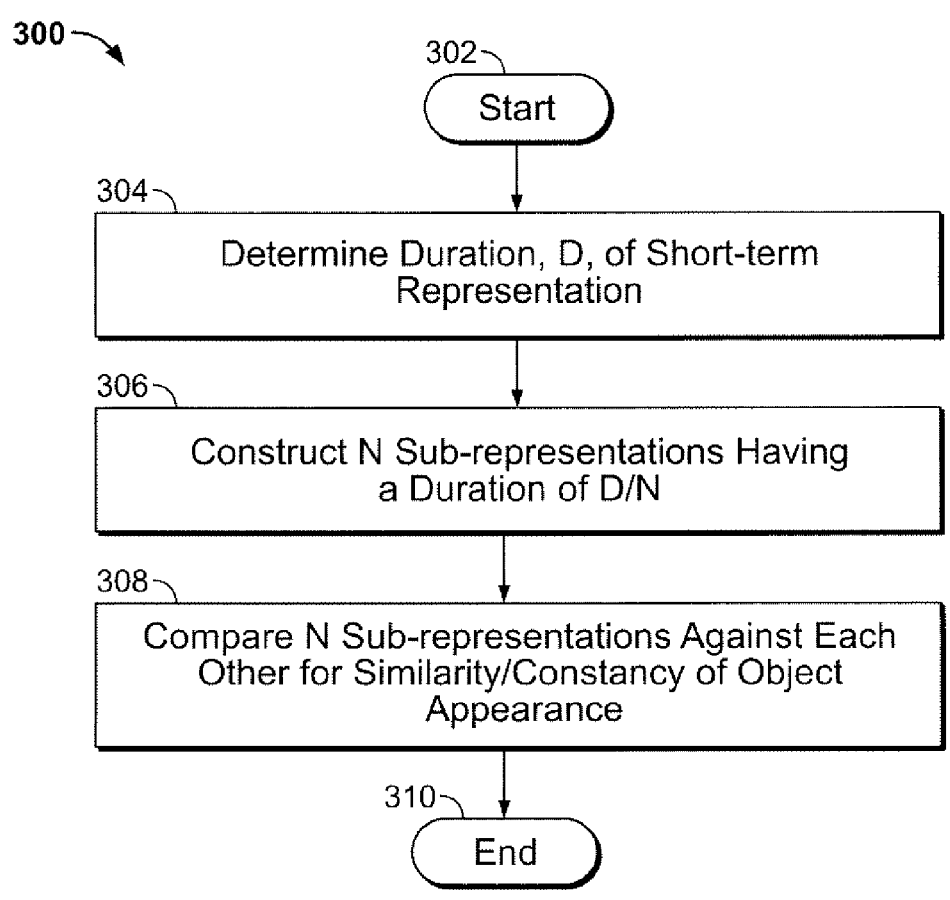
FIG. 3 is a flow diagram illustrating one embodiment of a method for determining the constancy in appearance of a detected potential left object.

FIG. 3 is a flow diagram illustrating one embodiment of a method 300 for determining the constancy in appearance of a detected potential left object, for example in accordance with the application of predefined criteria as discussed in step 110 of the method 100 (e.g., condition number 1). The method 300 is initialized at step 302 and proceeds to step 304, where the method 300 determines the duration, D, of the short-term representation (e.g., the left object detection time period).

In step 306, the method 300 constructs N sub-representations each having a duration of approximately D/N. That is, rather than create a single short-term representation of duration D for analysis, the method 300 creates a plurality of smaller short-term representations that, together, span the total duration, D, of the short-term representation.

Once N sub-representations have been created, the method 300 proceeds to step 308 and compares the N sub-representations against each other for inter-similarity. That is, the method 300 identifies an object in the short-term representation that is a potential left object, and then determines how constant that object's appearance is over the duration, D, of the short-term representation (e.g., from sub-representation to sub-representation). If the object's appearance is substantially constant over the duration, D, of the short-term representation (e.g., at least meets a pre-defined minimum threshold for similarity), then the object is more likely to be a left object. If the object's appearance is not substantially constant over the duration, D, of the short-term representation (e.g., does not at least meet the minimum predefined for similarity), then the object is less likely to be a left object. In one embodiment, the threshold for similarity between sub-representations is adjustable based on median noise levels over the entire short-term representation, such that the method 300 is adaptable to global noise.

The method 300 thereby facilitates the classification of detected potential left objects. Since the short-term representations are constructed in a manner that substantially excludes dynamic objects, occasional occlusions or appearance changes should not substantially affect comparisons for similarity between sub-representations. Furthermore, if a histogram-based method such as the method 200 is incorporated for constructing the representations, distinction can be easily made between relatively insignificant differences in sub-representations (e.g., blinking lights on a stationary vehicle) and significant differences (e.g., a fluttering leaf).

Figure 4:
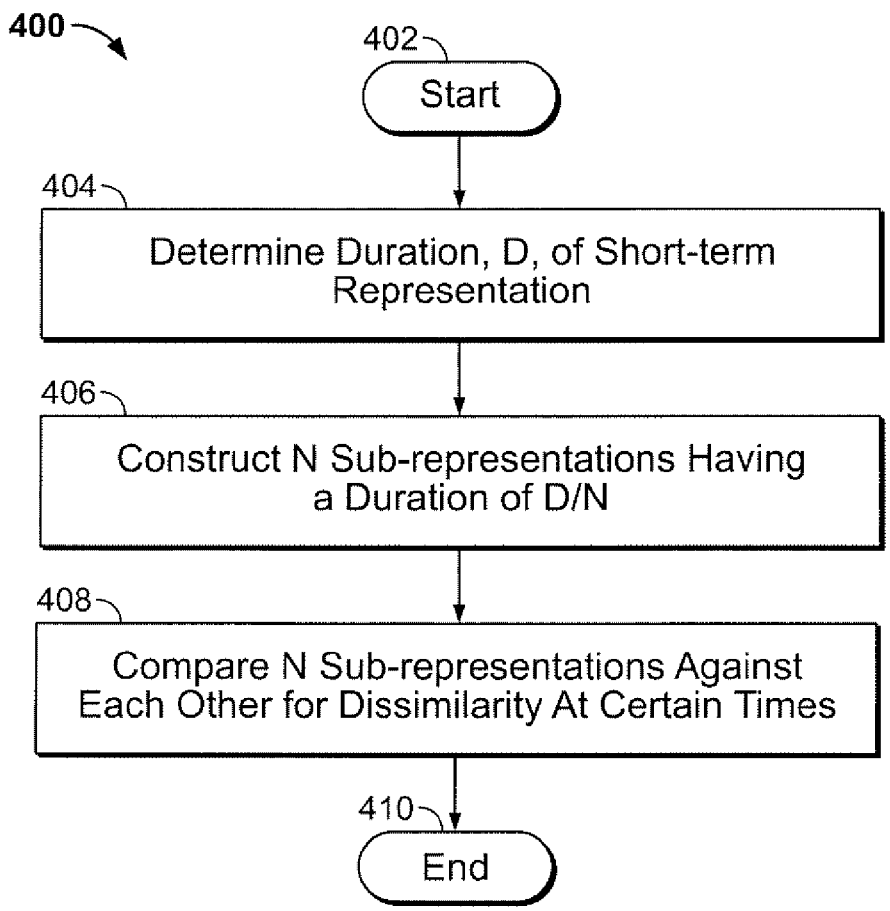
FIG. 4 is a flow diagram illustrating one embodiment of a method for differentiating a detected potential left object's appearance from the background appearance.

FIG. 4 is a flow diagram illustrating one embodiment of a method 400 for differentiating a detected potential left object's appearance from the background appearance, for example in accordance with the application of predefined criteria as discussed in step 110 of the method 100 (e.g., condition number 2). The method 400 is substantially similar to the method 300 discussed above. The method 400 is initialized at step 402 and proceeds to step 404, where the method 400 determines the duration, D, of the short-term representation.

In step 406, the method 400 constructs N sub-representations each having a duration of approximately D/N such that, together, the N sub-representations span the total duration, D, of the short-term representation.

Once N sub-representations have been created, the method 400 proceeds to step 408 and compares the N sub-representations against each other for dissimilarity at certain times. Specifically, the method 400 identifies an object in the short-term representation that is a potential left object, and then determines how different that object's appearance is from the appearance of the background just before the object is detected. The matching criterion applied in step 408 is thus the negative of the criteria implemented in step 308 of the method 300 for the similarity check. If the object's appearance is substantially different from the appearance of the background just before the object is detected (e.g., at least meets a predefined minimum threshold for dissimilarity), then the object is more likely to be a left object. If the object's appearance is not substantially different from the appearance of the background just before the object is detected (e.g., does not at least meet a predefined minimum threshold for dissimilarity), then the object is less likely to be a left object. In one embodiment, the threshold for dissimilarity between sub-representations is adjustable based on median noise levels over the entire short-term representation, such that the method 400 is adaptable to global noise.

Figure 5:
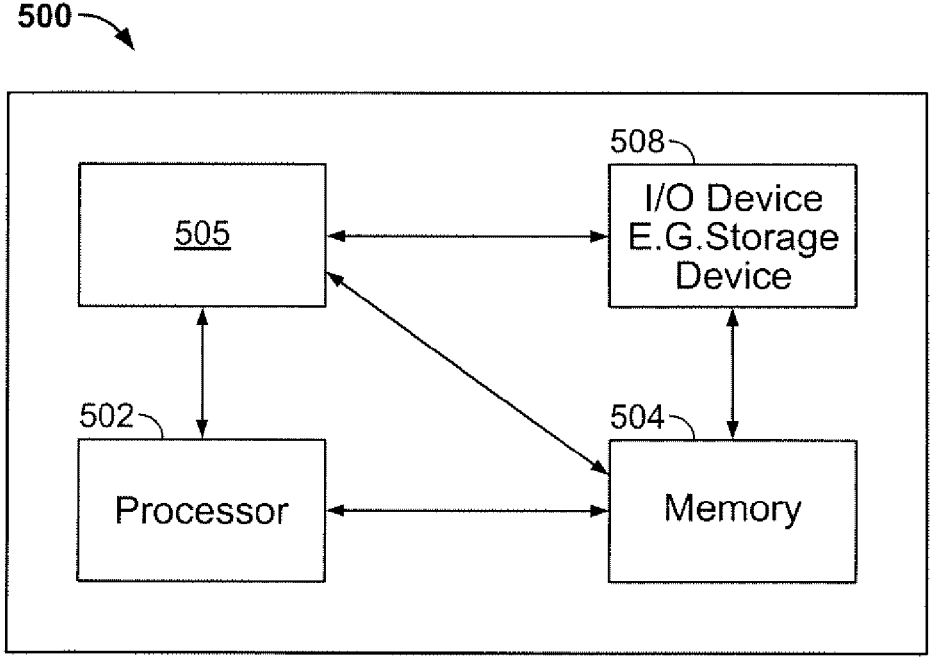
FIG. 5 is a high level block diagram of the left object detection method that is implemented using a general purpose computing device.

FIG. 5 is a high level block diagram of the left object detection method that is implemented using a general purpose computing device 500. In one embodiment, a general purpose computing device 500 comprises a processor 502, a memory 504, a left object detection module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the left object detection module 505 can be implemented as a physical device or subsystem that is coupled to a processor through a communication channel.

Alternatively, the left object detection module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the left object detection module 505 for detecting left objects in secure locations described herein with reference to the preceding Figures can be stored on a computer readable medium or carrier (e.g., RAM, magnetic or optical drive or diskette, and the like).

Thus, the present invention represents a significant advancement in the field of surveillance. A method and apparatus are provided that enable the rapid detection of left objects with a substantially reduced occurrence of false alarms in monitored locations using local spatio-temporal constraints, without necessarily tracking multiple objects over the field of view, and thus is not affected by inherent drawbacks of techniques relying on long-term object tracking. The present invention is able to distinguish between objects that may legitimately be a security concern and harmless environmental or incidental conditions, thereby substantially restricting analysis to events that most require further inspection or analysis.

While the foregoing is directed to embodiments of the present invention, other and further embodiments of the invention may be devised without departing from the basic scope thereof, and the scope thereof is determined by the claims that follow.

The invention claimed is:

1. A method for detecting an object left in a field of view, comprising:
    constructing a long-term representation of said field of view;
    constructing a short-term representation of said field of view that is shorter in duration than said long-term representation;
    calculating a difference between said long-term representation and said short-term representation; and
    classifying said difference as said left object, said classifying being performed in accordance with at least one predefined criterion, said at least one predefined criterion comprising a constancy in appearance of said difference,
    wherein at least one of said long-term representation and said short-term representation is constructed according to a method based on, for each pixel in each frame of a sequence of frames of a desired representation of the field of view, modeling a histogram representation of intensity variations of said pixel over said sequence.

2. The method of claim 1, wherein said calculating is performed in accordance with one or more local spatio-temporal constraints.

3. The method of claim 1, wherein said at least one predefined criterion increases a measure of confidence that said difference represents said left object.

4. The method of claim 1, wherein said at least one predefined criterion further comprises at least one of:
    a difference in an appearance of a background of said field of view just prior to an occurrence of said difference relative to an appearance of said difference,
    a manner in which said difference is introduced into said field of view and
    an occurrence of motion prior or proximate to a time at which said difference is introduced into said field of view.

5. The method of claim 1, therein said constancy in appearance is assessed in accordance with a method comprising:
    dividing said short-term representation into a plurality of sub-representations of substantially equal duration; and
    comparing said plurality of sub-representations against each other for similarity.

6. The method of claim 5, wherein said similarity is assessed in accordance with a predefined threshold on the histogram representation of intensity variations.

7. The method of claim 6, wherein said predefined threshold is adjustable based on a median noise level over said short-term representation.

8. The method of claim 4, wherein said difference in an appearance of a background of said field of view just prior to an occurrence of said difference relative to an appearance of said difference is assessed in accordance with a method comprising:
dividing said short-term representation into a plurality of sub-representations of substantially equal duration; and
comparing said plurality of sub-representations against each other for occurrences of dissimilarity.

9. The method of claim 8, wherein said dissimilarity is assessed in accordance with a predefined threshold.

10. The method of claim 9, wherein said predefined threshold is adjustable based on a median noise level over said short-term representation.

11. A computer-readable medium having stored thereon a plurality of instructions, the plurality of instructions including instructions which, when executed by a processor, cause the processor to perform the steps of a method for detecting an object left in a field of view, comprising:
constructing a long-term representation of said field of view;
constructing a short-term representation of said field of view that is shorter in duration than said long-term representation;
calculating a difference between said long-term representation and said short-term representation; and
classifying said difference as said left object, said classifying being performed in accordance with at least one predefined criterion, said at least one predefined criterion comprising a constancy in appearance of said difference,
wherein at least one of said representation and said short-term representation is constructed according to a method based on, for each pixel in each frame of a sequence of frames of a desired representation of the field of view, modeling a histogram representation of intensity variations of said pixel over said sequence.

12. The computer-readable medium of claim 11, wherein said classifying is performed in accordance with at least one predefined criterion further comprises at least one of:
a difference in an appearance of a background of said field of view just prior to an occurrence of said difference relative to an appearance of said difference,
a manner in which said difference is introduced into said field of view or
an occurrence of motion prior or proximate to a time at which said difference is introduced into said field of view.

13. The computer-readable medium of claim 12, wherein said constancy in appearance is assessed in accordance with a method comprising:
dividing said short-term representation into a plurality of sub-representations of substantially equal duration; and
comparing said plurality of sub-representations against each other for similarity.

14. The computer-readable medium of claim 12, wherein said difference in an appearance of a background of said field of view just prior to an occurrence of said difference relative to an appearance of said difference is assessed in accordance with a method comprising:
dividing said short-term representation into a plurality of sub-representations of substantially equal duration; and
comparing said plurality of sub-representations against each other for occurrences of dissimilarity.

15. Apparatus for detecting an object left in a field of view, comprising:
means for constructing a long-term representation of said field of view;
means for constructing a short-term representation of said field of view that is shorter in duration than said long-term representation;
means for calculating a difference between sad long-term representation and said short-term representation; and
means for classifying said difference as said left object, said classifying being performed in accordance with at least one predefined criterion, said at least one predefined criterion comprising a constancy in appearance of said difference,
wherein at least one of said long-term representation and said short-term representation is constructed according to a method based on, for each pixel in each frame of a sequence of frames of a desired representation of the field of view, modeling a histogram representation of intensity variations of said pixel over said sequence.

* * * * *